United States Patent [19]
Perego

[11] Patent Number: 5,927,641
[45] Date of Patent: *Jul. 27, 1999

[54] CASSETTE WASTE TAPE RELOADER

[75] Inventor: Luciano Perego, Milan, Italy

[73] Assignee: Tapematic U.S.A., Inc., Orlando, Fla.

[ * ] Notice: This patent is subject to a terminal disclaimer.

[21] Appl. No.: 09/110,426

[22] Filed: Jul. 2, 1998

Related U.S. Application Data

[63] Continuation of application No. 08/847,891, Apr. 28, 1997, Pat. No. 5,806,784, which is a continuation of application No. 08/528,602, Sep. 15, 1995, abandoned, which is a continuation of application No. 08/145,334, Oct. 29, 1993, abandoned.

[30] Foreign Application Priority Data

Oct. 30, 1992 [IT] Italy ................... MI92A2505

[51] Int. Cl.$^6$ ........................... B65H 19/28; B65H 35/08; B65H 18/08
[52] U.S. Cl. ................ 242/532.1; 242/523.1; 242/526; 242/534; 242/532.3
[58] Field of Search ................ 242/523.1, 527, 242/527.5, 532.1, 534, 526, 563, 554.2, 537, 532.3; 156/505

[56] References Cited

U.S. PATENT DOCUMENTS

| | | | |
|---|---|---|---|
| 3,737,358 | 6/1973 | King | 242/527.5 X |
| 4,497,454 | 2/1985 | Woodley | 242/532.1 X |
| 4,722,488 | 2/1988 | Kubo | 242/532.1 |
| 4,770,359 | 9/1988 | Kiuchi | 242/526 |
| 4,836,464 | 6/1989 | Perego | 242/532.1 X |
| 5,221,404 | 6/1993 | Oya et al. | 242/526 X |

Primary Examiner—John Q. Nguyen
Attorney, Agent, or Firm—Frommer Lawrence & Haug LLP

[57] ABSTRACT

A tape loading apparatus and method wherein a cassette previously loaded with waste tape is engaged in a work station. A trailing section of the waste tape is extracted from a front opening of the cassette together with a second portion of a leader spliced thereto. The second portion of the leader is separated from the waste tape which is then connected to a previously discarded tape length which is susceptible of engagement with a winding for upon the action of which all waste tape is extracted from the cassette. When extraction is over, a first portion of the leader is separated from the extracted waste tape and then spliced to a new use tape to be loaded into the cassette.

8 Claims, 7 Drawing Sheets

CASSETTE WASTE TAPE RELOADER

This application is a continuation of U.S. Pat. No. 5,806,784, application Ser. No. 08/847,891, filed Apr. 28, 1997, which is a continuation of Ser. No. 08/528,602, filed Sep. 15, 1995, abandoned, which is a continuation of Ser. No. 08/145,334, filed Oct. 29, 1993, abandoned.

FIELD OF THE INVENTION

The present invention relates generally to automatic cassette tape loading apparatuses and methods and more particularly to automatic cassette tape loading apparatuses and methods which permit the re-use of cassettes previously loaded with tape.

BACKGROUND OF THE INVENTION

The loading of magnetic tape into audio and/or video cassettes is typically carried out by appropriate cassette loading machines that, at each work cycle, pick up an empty cassette from an infeed conveyor and operatively engage it in a work station where it is loaded with magnetic tape (hereinafter referred to as "use tape") continuously fed from a supply reel or "pancake."

In greater detail, the cassette reaching the loading station contains a leader connected to both ends of the first and second winding hubs which are rotatably housed in the cassette.

Suitable extractor means carry out the extraction of the leader from a front opening provided in the cassette and place it onto an engagement surface on support blocks, said blocks being at least periodically aligned close to the front opening of the cassette.

Cutting means operate between the support blocks and cut the leader into a leading portion engaged to a first block and connected to the first winding hub and a second portion engaged to a second block and connected to the second winding hub.

By imparting a movement to the second block, a leading end of the use tape to be loaded is positioned in a second holding track molded in the second block. The use tape to be loaded is aligned with the first portion of the leader and subsequently spliced thereto through application of adhesive joining tape, upon the action of a splicing unit acting on the blocks.

The first winding hub rotates thereby causing a predetermined amount of use tape to be wound onto the cassette. When the winding is complete, the use tape still engaged to the support blocks is cut by said cutting means and, by displacing the second block again, the second portion of the leader is brought into alignment with the trailing end of the loaded use tape to which it is spliced. A further rotation of the first winding hub causes the end portion of the use tape and the second portion of the leader to be introduced into the cassette front opening, said cassette is then ejected from the loading station, while a new cassette to be processed takes its place.

With respect to the above explanation it is obvious that in the field of mass-produced loaded cassettes it is a relatively frequent occurrence for use tape loaded into a cassette to exhibit manufacturing defects, such as imperfect oxide coating of the tape.

In this case and others, e.g., when cassettes are loaded with defective recordings, the wrong length of tape, tape with oxide voids, or unwanted pre-recorded programs, the loaded cassette must be discarded. As a result, a substantial amount of cassettes are produced which must be discarded as waste products. This procedure involves a considerable loss of money due to both the costs of the cassettes and the use tape, which are thrown away. The cost for transporting these cassettes to disposal sites can also be large. Finally, disposal of these products as waste raises serious ecological concerns frequently resulting in the payment of heavy taxes.

SUMMARY OF THE INVENTION

An object of the present invention is to solve the above problems by a new loading process wherein it is possible to extract the waste tape from a loaded cassette in a very short period of time, making the cassette immediately available for loading with use tape again, without damaging the finished product.

In greater detail, the invention pertains to a cassette tape loading process which provides for utilizing cassettes previously loaded with tape ("waste tape"), wherein before the leading end of the use tape to be loaded is spliced to the first portion of the leader, the following steps are carried out: the second portion of the leader joined to a trailing section of the waste tape wound onto the first hub from the front opening of the cassette is extracted; the second portion of the leader is cut so as to separate it from the tape to be discarded; the trailing section of the waste tape is connected to auxiliary threading means operating outside the cassette; the waste tape from the first hub is unwound by means of the auxiliary threading means until the first portion of the leader is drawn out of the cassette opening; the first portion of the leader is then cut so as to separate it from a leading section of the waste tape extracted from the cassette; bringing the first portion of the leader is brought into alignment with the leading end of the use tape which is to be loaded. The loading process as described previously resumes, starting from the splicing of the use tape to the first portion of the leader.

In accordance with the invention, this process is put into practice by an apparatus characterized by auxiliary threading means which extracts waste tape wound onto a first hub from the cassette; and means for operatively connecting the auxiliary threading means with a trailing section of the waste tape previously separated from the second leader portion by said cutting means.

BRIEF DESCRIPTION OF THE DRAWINGS

Further features and advantages will become more apparent from the detailed description of the preferred embodiment of a cassette tape loading process which provides for reuse of cassettes previously loaded with waste tape, and an apparatus for putting the process into practice, in accordance with the present invention. The description is given hereinafter, by way of a non-limiting example, with reference to the accompanying drawings, in which.

DETAILED DESCRIPTION

Figure 1:
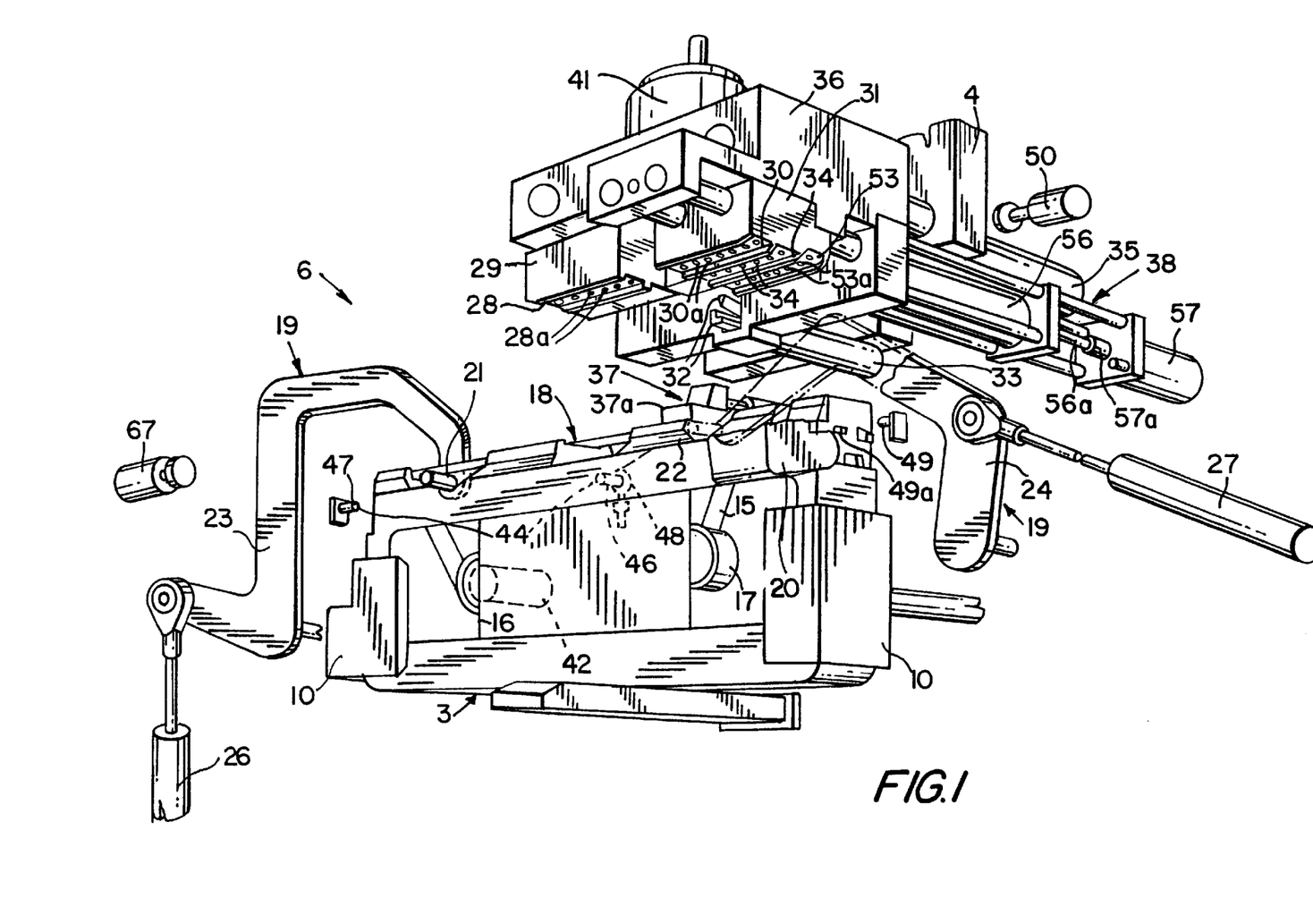
FIG. 1 is a fragmentary perspective view of a work station of a machine for loading tape into cassettes, adapted to carry out the process of the present invention.
Figures 2, 6:
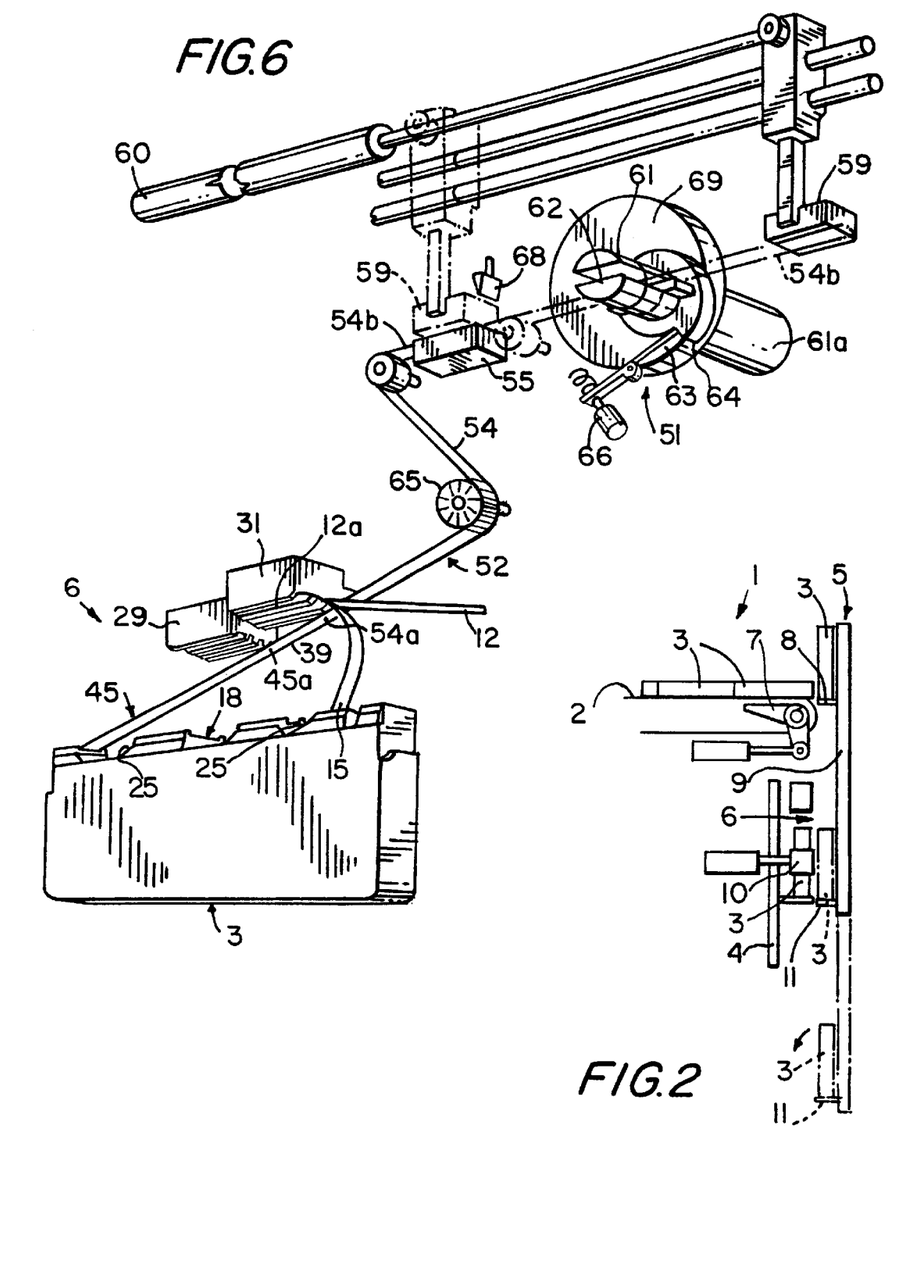
FIG. 2 is a diagrammatic vertical section of the machine, taken at the work station.
FIG. 6 is another perspective view of the cassette during the step in which the waste tape is extracted therefrom by auxiliary threading means.

Referring particularly to FIGS. 1 and 2, reference number 1 generally denotes a cassette loading machine which employs a cassette tape loading process for reusing cassettes previously loaded with waste tape, in accordance with the present invention.

As shown in FIG. 2, the loading machine 1 provides for the use of a cassette feeding unit consisting of a belt conveyor 2 on which a plurality of cassettes 3 being processed are disposed, said cassettes being sequentially conveyed to a front panel 4 of the machine. Delivery means 5 pick up the individual cassettes 5 from the conveyor belt 2 and sequentially engage them in a work station 6 where each cassette undergoes the different operating steps for accomplishing the loading process. The delivery means 5 comprises an overturning device 7 that, at each operating cycle, picks up one cassette 3 from the end of the belt conveyor 2 and arranges it vertically on first support elements carried by a transferring member 9. The transferring member 9 is movable along vertical guides (not shown) between one position in which it receives the cassette 3 engaged by the overturning device 7, and a second position in which said cassette is engaged in a pair of side guides 10 that, following a displacement towards the front panel 4, cause the cassette to be operatively engaged in the work station 6.

The reception by the transferring member 9 of the cassette 3 engaged in the overturning device 7, and the engagement of a loaded cassette 3 on second support elements 11 carried by the transferring member occurs simultaneously. The loaded cassette 3 will then be moved away from the work station 6 simultaneously with lowering of the transferring member 9 to the second position and will be sent, to a collection conveyor not shown.

In the embodiment shown, the loading machine 1 is capable of carrying out the loading of empty audio or video cassettes (referred to as C-0 or V-0 cassettes) according to a conventional processing cycle which winds a predetermined amount of use tape 12 into a cassette, from a pancake which continuously supplies tape.

This processing cycle is described hereinafter to make the description easily understood.

Figure 3:
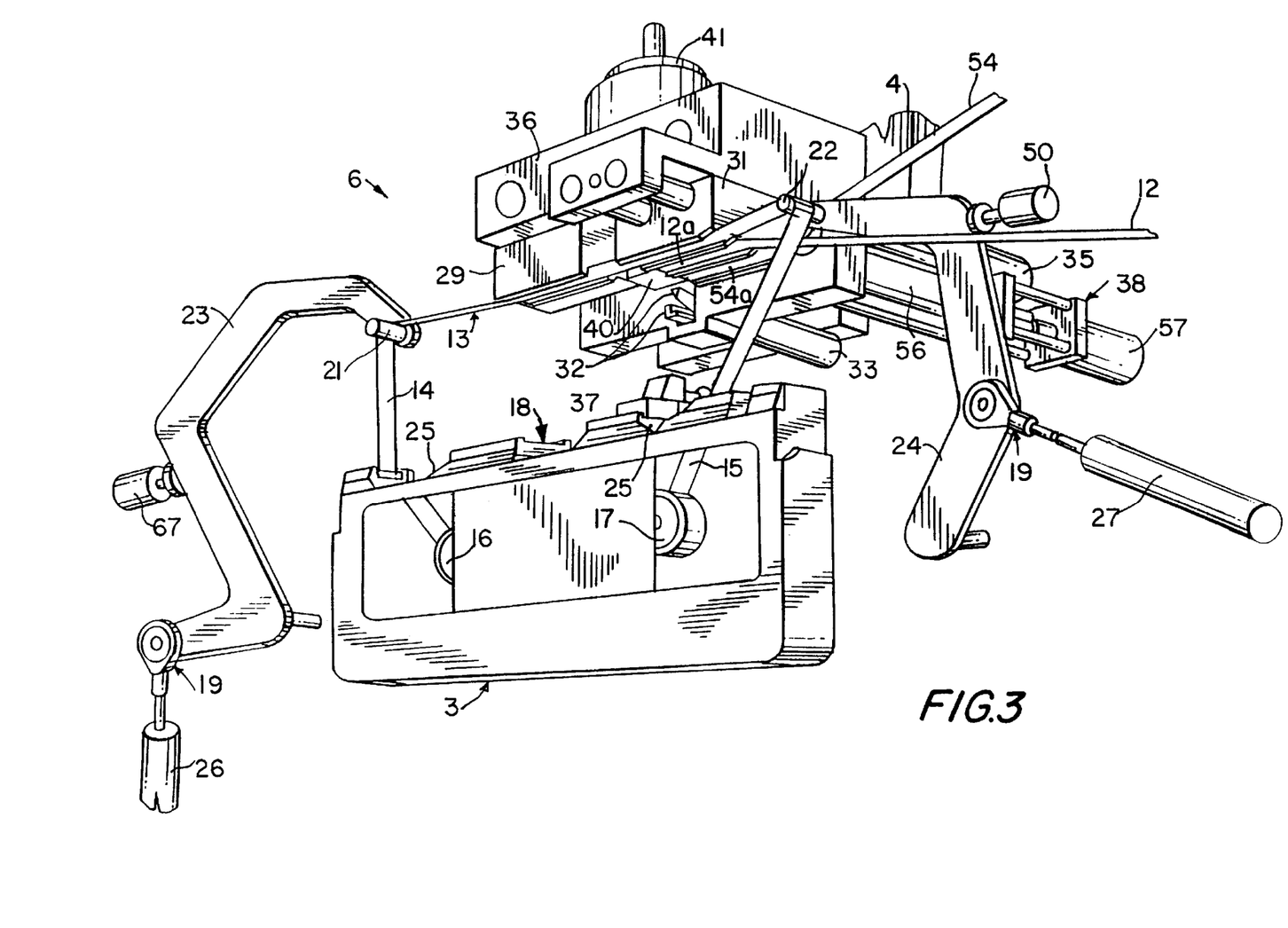
FIG. 3 is a diagrammatic front view showing a V-0 ("empty") cassette disposed in the work station, during the step of extracting the leader from the front opening thereof.

As shown in FIG. 3, cassettes 3 reaching the work station 6 have a leader 13 comprising a first portion 14, and a second portion 15 respectively connected to first and second winding hubs, 16 and 17, rotatably housed in the cassette.

In the cassettes 3 the first and second portions, 14 and 15, of leader 13 form a single leader piece stretched before a front opening 18 of the cassette 3.

In the work station 6 provision is made for extraction means 19 to suitably extract the leader 13 from the front opening 18. The extraction means 19 preferably comprises first and second extractor elements 21, 22 attached to the ends of a first and second drive arm, 23, 24 respectively, and arranged to penetrate into corresponding access locations 25 provided close to the front opening 18 of the cassette 3, as soon as the cassette is operatively engaged in the work station 6. Each extractor element 21, 22 can be displaced, upon command of the main actuator 26, 27 acting on the corresponding drive arm 23, 24 between a rest position in which, as shown in FIG. 3, it is located at the outside of the front opening 18 of the cassette 3 to a predetermined distance therefrom.

As clearly shown in FIG. 3, after the empty cassette has been engaged in the work station 6, extractor elements 21, 22 are moved to the maximum-extracted position so that the leader 13 is extracted to a point above the cassette front opening 18.

In greater detail, the leader 13 is positioned on an engagement surface 28 exhibited by a first support block 29 and a first holding track 30 disposed in alignment with the engagement surface 28 and exhibited by a second support block 31 positioned side by side with the first block 29. The engagement surface 28 and the first holding track 30 facing the cassette front opening 18 are designed to hold the leader 13 by a suction action produced through a plurality of holes 28a, 30a located in the surface of the track.

A first cutting means operates between the first and second blocks 29 and 31. It comprises a first cutter 32 operated by an actuator 33 that cuts the leader 13 in a transverse direction, so as to sever it into a first portion 14 and a second portion 15. When the cut has been executed, the first portion 14 extends between the first support block 29 and the first winding hub 16; the second portion 15 extends between the second support block 31 and the second winding hub 17.

At this point the first portion 14 of leader 13 must be connected to the use tape to load the use tape into the cassette 3. In greater detail, the use tape 12 has a leading end 12a engaged to the second block 31 at a second holding track 34 which is parallel to the first holding track 30 which is also provided with respective suction holes 34a to hold the tape in place as described earlier.

Figure 12:
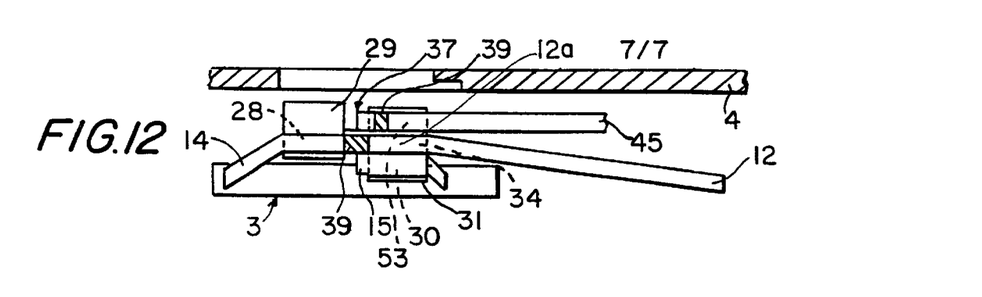
Figure 13:
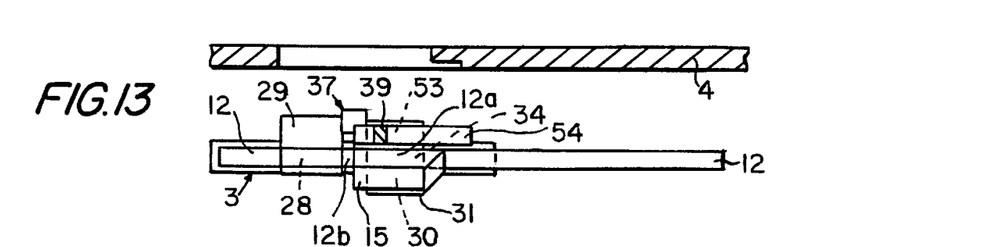
Figure 14:
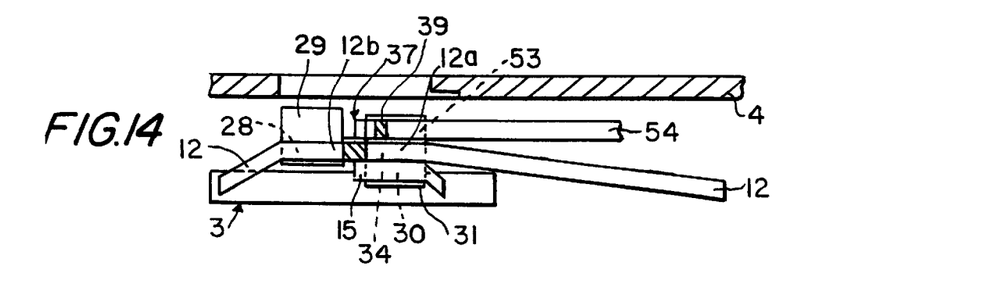

Upon return of the extractor members 21, 22 to the rest position, suitable displacement means consisting of a displacement actuator 35 acting on a frame 36 carrying both blocks 29, 31 causes the simultaneous displacement of the blocks from a first operating condition in which the engagement surface 28 and holding seat 34 aligned therewith are facing the front opening 18, to a second operating condition in which the engagement surface 28 and holding seat 34 aligned therewith are facing the front opening 18, to a third operating condition in which the engagement surface and holding seat are operatively located in front of a splicing unit 37 mounted to the front panel 4 at a laterally offset position with respect to the cassette 3. Simultaneously with this operation, upon the action of drive means 38, the second support block 31 is moved relative to the first support block 29 so that the second holding seat 34 is brought into alignment with the engagement surface 28 of the first block and, as a consequence, the leading end 12a of the use tape 12 to be loaded is brought into alignment with the first leader portion 14 (FIG. 12). The splicing unit 37, via an arm 37a movable towards the blocks 29, 31, applies a first adhesive joining tape 39 onto the ends of the first portion 14 of the leader and the leading part 12a of the tape, so as to join them. An abutment element 40, intermediate the blocks 29, 31, acts against the action of the arm 37a in order to ensure adhesion of the adhesive tape 39 to the leader 13 and use tape 12. This abutment element 40 is movable, upon command of a fluid-operated cylinder 41, in order to make room for the first cutting member 32 when it is operated.

Blocks 29, 30 are again brought to the first operating condition and, upon disengagement of the first portion 14 of the leader and the use tape to be loaded 12 by interruption of the suction effect on the engagement surface 28 and second holding track 34, the first winding hub 16 is driven in rotation upon the action of a winding spindle 42 (FIG. 1) so as to cause the winding of a predetermined amount of use tape 12.

When the desired amount of use tape 12 has been wound onto the hub 16, the tape is engaged on the engagement surface 28 of the second holding track 34 of blocks 29, 31 by a new displacement of the extractor element to the maximum-extracted position. The use tape 12 is then cut by the first cutter 32. The blocks 29, 31, upon returning of the extractor elements 21, 22 to the rest position, are brought to the second operating condition. Simultaneously with this operation, the second block 31 is moved relative to the first block 29 so as to bring the second leader portion 15 into alignment with the trailing end 12b of the tape 12 held on the engagement surface 28.

Figure 15:
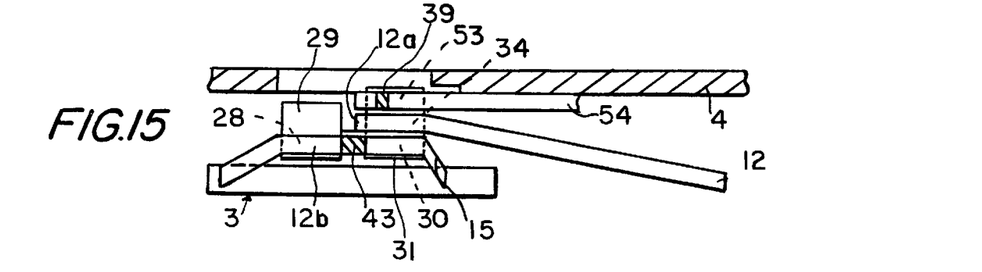

Then the splicing unit 37 applies another piece of adhesive joining tape 43 (FIG. 15) to join the trailing end 12b of the use tape and the second portion 15 of the leader.

The cassette loading process is completed by again driving the first winding hub 16 in rotation, to make the tape 12 and the second portion of leader 15 enter the cassette opening 18. The cassette is then released from the work station 6 and moved away by the transferring member 9. The leading end 12a of the use tape 12 is thereafter maintained on the second holding track 34 of the second block 31 until the next cassette is in condition for loading.

In accordance with the present invention, the loading machine 1 can also be used for removing "waste tape" to permit the reusing of previously loaded cassettes 3.

Cassettes 3, preloaded with waste tape 45, can be fed to the belt conveyor 2 by way of an up-feed conveyor (not shown). These preloaded cassettes can be fed, intermixed with standard, empty cassettes.

In accordance with the invention, in order to enable the apparatus 1 to differentiate between preloaded cassettes 3 from empty cassettes, sensor means 44 are associated with the work station 6, for detecting the presence of waste tape 45 within each cassette 3 engaged in the work station.

The sensor means 44 comprise at least one photoemitter 46 and one photoreceiver 47 located at the inside and outside respectively of the cassette 3 engaged in the work station 6. The Photoemitter 46, upon engagement of the cassette 3 in the work station 6, enters a standard housing 48 arranged in the cassette and emits a light signal detectable by the first photoreceiver 47, through a standard aperture (not shown in the drawings) in the cassette.

In the absence of waste tape 45 in the cassette 3, the light signal passes through the first portion 14 of the leader to the first photoreceiver 47. Conversely, in the presence of waste tape 45 wound onto the first hub 16, the light signal is blocked, as the tape is not transparent and the first photoreceiver 47 receives no signal. This lack of a signal indicates the presence of waste tape 45 on the first hub 16.

A second photoreceiver 49 is located on the outside of the cassette, at a laterally opposite position relative to the first photoreceiver 47. This second photoreceiver 49 senses the light signal emitted from photoemitter 46 through a corresponding aperture 49a, in order to detect the presence of waste tape 45 wound onto the second hub 17, following the same modalities as previously described with reference to the first photoreceiver 47.

If both photoreceivers 47, 49 receive a signal from the photoemitter 46, a microprocessor (not shown) drives the loading machine 1 in operation according to the standard processing cycle described above in reference to the loading of empty cassettes.

Conversely, if the sensor means 44 detects the presence of waste tape 45 inside the new cassette 3 engaged in the work station 6, the microprocessor drives the execution of a new loading process for reuse of the previously loaded cassette 3.

If the second photoreceiver 49 detects the presence of waste tape 45 wound onto the second hub 17, it is possible to completely rewind the waste tape 45 onto the first hub itself or, alternatively, the cassette 3 can be directly disengaged from the work station to make room for a new cassette 3 being processed.

When the extractor elements 21, 22 leave their rest position, the second portion 15 of the leader and a trailing section 45a of the waste tape 45 are brought into engagement on the first holding track 30 of the second support block 31 and the engagement surface 28 of the first support block 29, respectively, the holding track and engagement surface being in mutual alignment.

Figure 4:
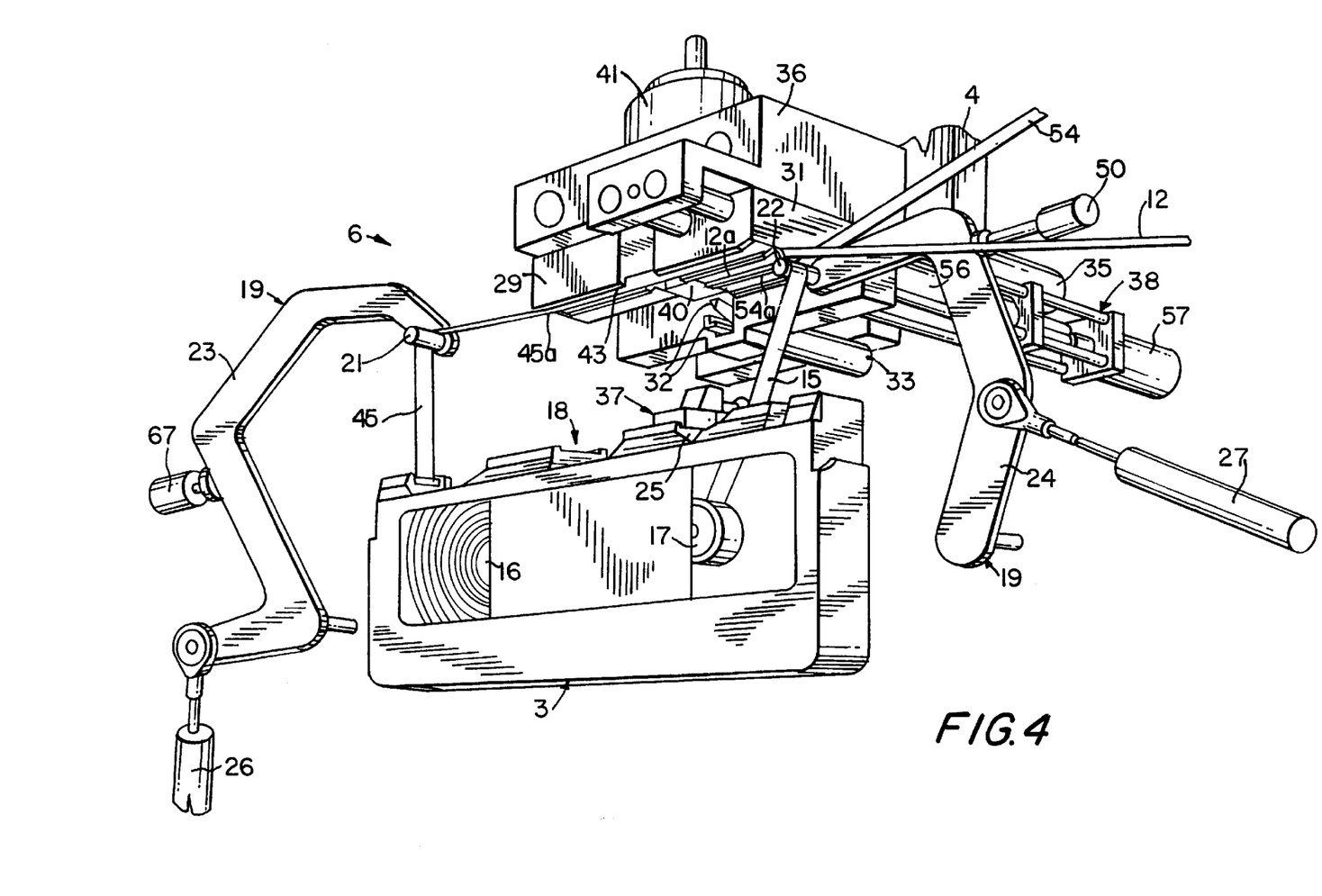
FIG. 4 shows a cassette previously loaded with waste tape, wherein a second leader portion is getting ready to be separated from the waste tape contained in the cassette.
Figure 7:
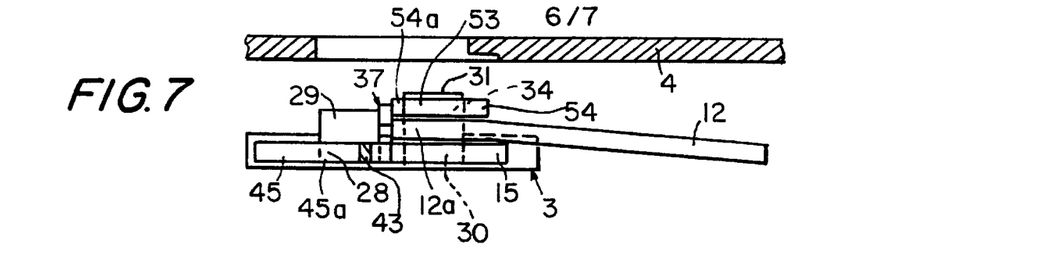
FIGS. 7 to 16 diagrammatically show, in top views, the positions taken by the support blocks with respect to the cassette being processed, during the different steps of the process in question.

Simultaneously with this engagement step, the splice between the waste tape 45 and second portion 15 of the leader, represented by the second adhesive joining tape 43 applied in the processing cycle previously executed on the same cassette is advantageously positioned on the first block 29, in such a manner that it is laterally offset towards the first block, with respect to the direction of operation of the first cutting member 32 (FIGS. 4 and 7). This positioning of the splice is achieved by bringing the first extractor element 21 to the maximum-extracted position and simultaneously bringing the second extractor element 22 to an intermediate position between the rest position and the corresponding maximum-extracted position.

As shown in FIG. 4, the second extractor element 22 is stopped in an intermediate position by means of a first auxiliary actuator 50, which, when activated, impedes the displacement of the second drive arm 24 by working against the action of the corresponding main actuator 27.

Upon the action of the first cutting member 32, the second portion 15 of the leader is cut and completely cleared of the second adhesive joining tape 43, which remains attached to the trailing section 45a of the waste tape 45 held on the engagement surface 28 of the first block 29.

The trailing section 45a of the waste tape 45 can then be connected to auxiliary threading means 51 (FIG. 6) to take the waste tape completely out of the cassette 3.

In greater detail, the connection of the trailing section 45a of the waste tape 45 with the auxiliary threading means 51 is carried out by interconnecting means 52 which includes a third holding track 53, located on the second block 31, parallel to the second holding track 34. The third holding track 53 holds an end portion 54a of a tape length 54 discarded in a previous processing cycle. The foremost portion 54b of tape length 54 is engaged on a holding element 55 which is part of the auxiliary threading means 51. In the example shown, the holding element 55 comprises a fixed block having a support surface on which the foremost portion 54b of the tape length 54 is retained.

Figure 8:
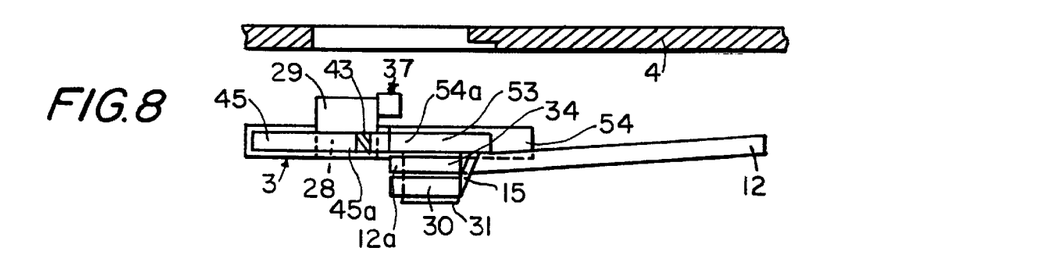

After cutting the second portion 15 of the leader and upon return of the extractor elements 21, 22 to the rest position, the second block 31 is moved with respect to the first block 29 so that the third holding track 53 carrying the end portion 54a of length 54 is aligned with the engagement surface 28 holding the trailing section 45a of the waste tape 45 (FIG. 8).

In accordance with a further feature of the present invention, in order to enable the first, second and third holding tracks 30, 34, 54 to be selectively brought into alignment with the engagement surface 28, the drive means 38 comprises a first movement actuator 56, the rod 56a of which (only partly shown in the drawings) acts on the second block 31 so as to move it from a first position in which the first holding track 30 is in alignment with the engagement surface 28, to a third position where the third holding track 53 is in alignment with the engagement surface 28. A second movement actuator 57 is fixed in succession to the first actuator 56. When activated, the second actuator acts, via rod 57a, against the rod 56a of the first actuator 56. This restrains the stroke of the second block 31 towards the third position, stopping it at a second position where the alignment of the second holding track 34 with the engagement surface 28 is achieved.

Figure 9:
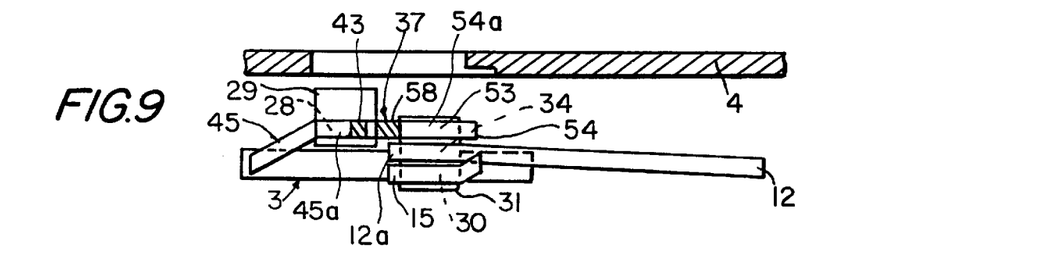

After the third holding track 53 has been brought into alignment with the engagement surface 28, the first and second blocks 29, 31 are brought to the second operating position and the splicing unit 37 carries out the splicing between the trailing section 45a of the waste tape 45 and the first end portion 54a of the tape length 54, by application of a third adhesive joining tape 58 (FIG. 9).

Blocks 20, 31 are brought back to the first operating position and, upon disengagement of the waste tape 45 and tape length 54 from said blocks by interruption of the suction effect, the extraction of the waste tape 45 from the cassette 3 is initiated by the action of the auxiliary threading means 51.

The auxiliary threading means 51 comprise a gripper element 59 controlled by a fluid-operated displacement cylinder 60. The gripper element is movable between a first position in which it is disposed close to the holding element 55 for picking up the foremost portion 54b of length 54, and a second position in which it is moved away from the holding element 55 so that it can extend the tape length 54 in a predetermined direction.

A winding fork 61 operates on the length portion 54 extending between the holding element 55 and gripper element 59 moved to the second position. The fork is movable perpendicularly to the movement of the gripper element 59 between a rest position in which it does not interfere with the movement of the gripper element, and an operating position in which, as shown in FIG. 4, it operatively engages the tape length 54 at a diametrical slit 62 provided in the fork itself. The orientation of the diametrical slit 62 is suitably fixed by a unidirectional ratchet pawl 63 capable of interfering with an abutment notch 64 carried on the periphery of fork 61, when the fork is driven in rotation by a motor 61a in a predetermined direction (clockwise with reference to FIG. 6).

Once engagement has occurred, the fork 61 is driven in rotation in a direction opposite to that causing the interference of the ratchet pawl 63 with the abutment notch 64 so that the fork carries out the threading and winding upon itself of the tape length 54 and waste tape 45 as it is drawn from the first hub 16.

A counter wheel 65 which is engaged in the path of the tape length 54 and waste tape 45 being unwound is driven in rotation at an angular speed proportional to the movement speed of the waste tape. When the difference between the angular speeds of the counter wheel 65 and first hub 16 detected by appropriate sensors reaches a predetermined value, the rotational speed of the winding fork 61 is reduced in order to prevent the leader 13 from being pulled away from the first hub 16, at the end of the waste tape 45 unwinding.

When unwinding is over, the leading section 45b of the waste tape 45 is extracted from the front opening 18 of the cassette 3 together with the first portion 14 of the leader.

The first extractor element 21 is moved from its rest position in order to cause the engagement of the first leader portion 14 and the leading section 45b of the waste tape 45 on the engagement surface 28 of the first block 29 and the third holding track 53 of the second block 31, respectively.

During this step, a portion of the waste tape 45 is required to be unwound from the winding fork 61. The fork thus must rotate in the opposite direction with respect to the winding direction. In order to avoid the rotation of the fork 61 being undesirably stopped, provision is made for a release actuator 66, acting on the unidirectional ratchet pawl 63, to move it to a position in which it does not interfere with the abutment notch 64 arranged in the fork.

Figure 5:
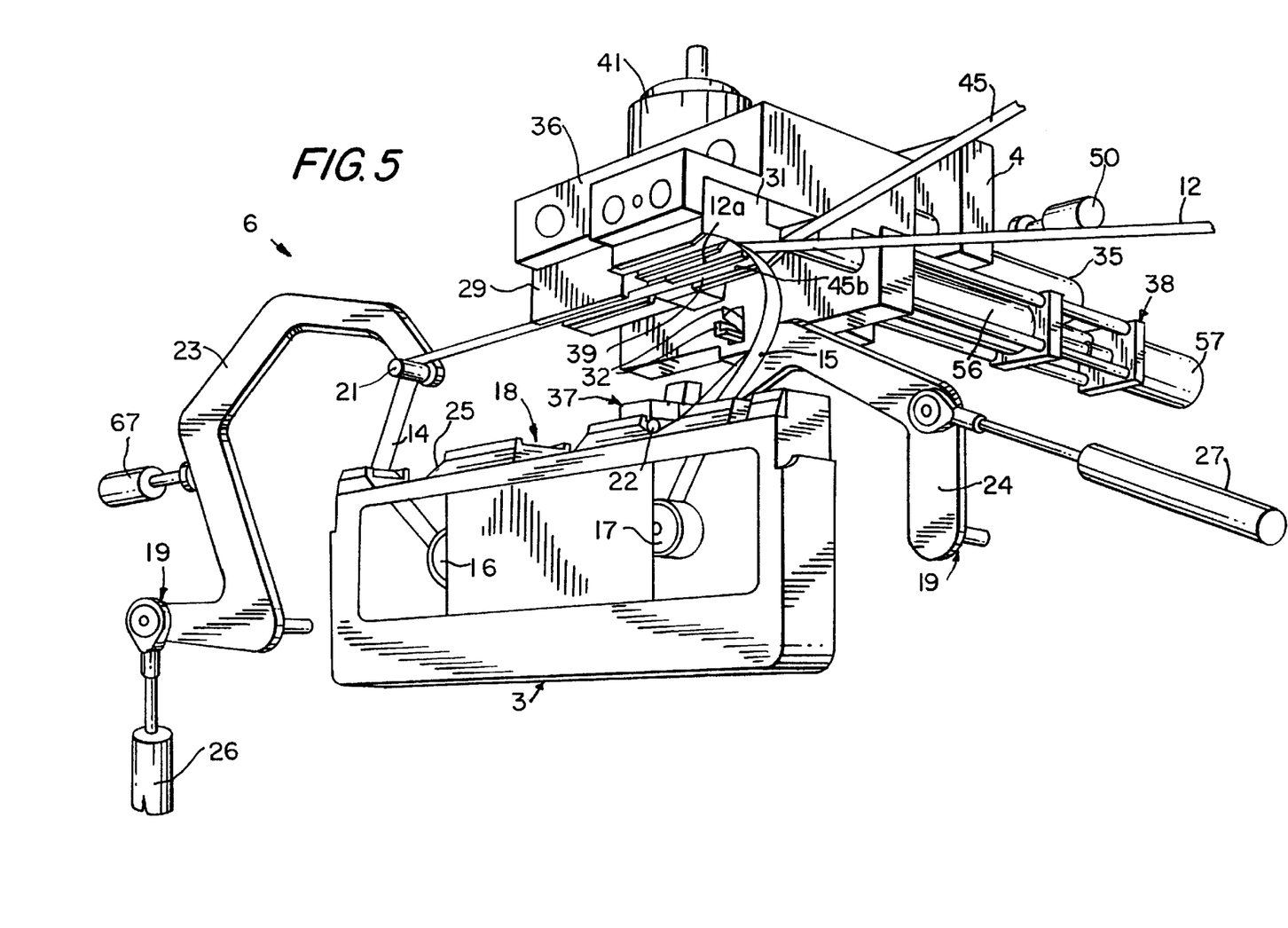
FIG. 5 shows the cassette of FIG. 4 during an operating step in which the waste tape extracted from the cassette is getting ready to be separated from a first leader portion.
Figure 10:
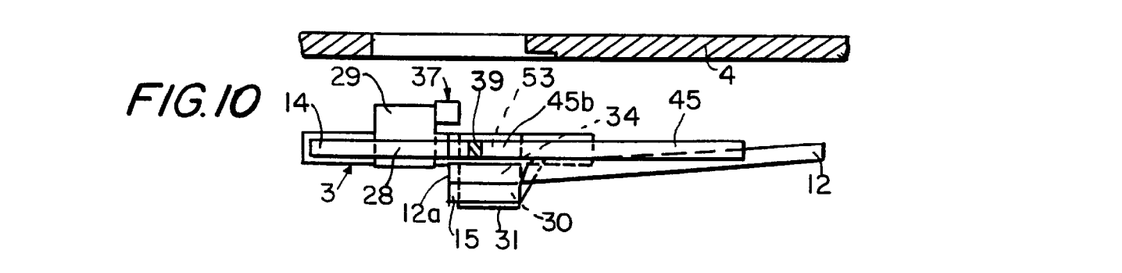
Figure 11:
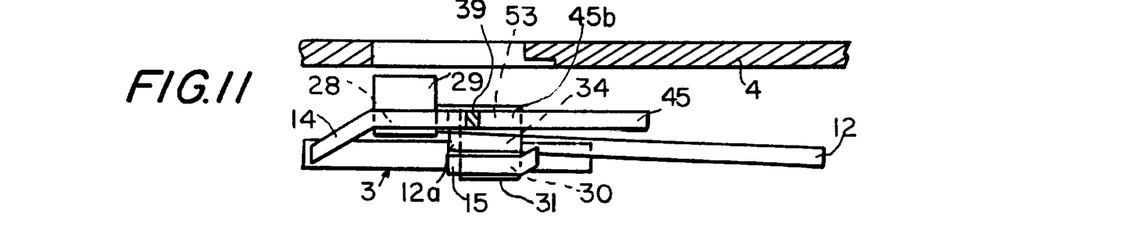

During the engagement of the first portion 14 of the leader and the leading section 45b of the waste tape 45 on blocks 29, 31, it is advantageously provided that the splice formed by the first adhesive joining tape 39 previously applied to said first leader portion and section, should be placed at a laterally offset position towards the second block 31 with respect to the other cutting direction, as shown in FIGS. 5 and 10.

To this end, during the shifting of the first extractor element 21 from the rest position, a second auxiliary actuator 67 (FIG. 5) is operated which is designed to act on the first drive arm 23 for stopping, against the action of the corresponding main actuator 26, the movement of the extractor element to a position intermediate the maximum-extracted position and rest position.

Subsequently the first cutting member 32 is operated to the first portion 14 of the leader. This completely separates it from the first adhesive tape 39, which is kept attached to the leader section 45b of the waste tape 45.

By operating the first and second movement actuators 56, 57 in combination, the second block 31 is moved to its second work position so that the second holding track 34 carrying the leading end 12a of the new use tape 12 is brought into alignment with the engagement surface 28 of the first block 29.

Figure 16:
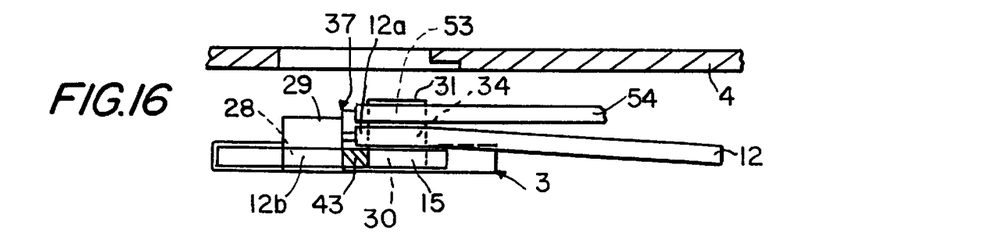

Then, the loading process continues following conventional modalities for loading empty cassettes starting from the step of splicing the first portion of leader 15 to the leading end 12a of the use tape 12 to be wound (see FIG. 16).

Meanwhile the waste tape 45 wound on the fork 61 is cut by an auxiliary cutter 68 at the holding element 55. This creates a new tape length 54 extending between the third holding track 53 of the second block 31 and the holding element itself. The waste tape roll 69 formed on fork 61 is dropped as a result of the backward movement of the fork to the rest position.

The method and apparatus of the present invention solves the majority of the problems connected with disposal of waste tape-loaded cassettes. In particular, all costs to be borne when waste products are to be deposited in disposal installations, as well as cost resulting from the necessity of stocking and periodically transferring important amounts of waste cassettes can be avoided. The intrinsic value of the recovered cassettes also represents a significant savings.

The method and apparatus of the present invention can be adapted to work with any type of apparatus used for loading empty cassettes. In fact, known loading machines can be modified in accordance with the present invention, by addition of the auxiliary threading means, up-feed conveyor means, interconnecting means and sensor means. Taking into account the construction complexity of loading machines, the addition of the above devices represents a modification of relatively easy accomplishment.

Although the present invention has been described with reference to a specific embodiment, it should not be construed as limited to the details disclosed herein, as the disclosed embodiment is merely illustrative of the invention.

I claim:

1. An apparatus for replacing a waste tape in a previously loaded cassette comprising:

a cassette loading station for operatively engaging a cassette to be processed;

extraction means for extracting tape from a cassette engaged in said loading station;

first tape holding means provided in an engagement surface of a movably supported first support block for holding a first portion of original use tape extracted from a cassette engaged in said loading station;

second tape holding means provided in a first holding track of a movably supported second support block for holding a portion of waste tape extracted from a cassette engaged in said loading station;

third tape holding means provided in a second holding track of said second support block for holding a trailing end of a new use tape extending from a tape supply, wherein a predetermined amount of said new use tape replaces the waste tape in said cassette engaged in said loading station;

fourth tape holding means provided in a third holding track of said second support block for holding an end portion of a waste tape length extending from auxiliary tape threading means for unwinding the waste tape from said cassette engaged in said loading station, and wherein said first and second blocks are selectively moved to align said engagement surface of said first block with said first, second and third tracks of said second block to perform cutting and splicing operations with respect to said original use tape, new use tape and waste tape; and wherein only said first and second support blocks support said original use tape, new use tape and waste tape during cutting and splicing of same.

2. The apparatus as claimed in claim 1, further comprising first cutting means for cutting tape portions extending between aligned tape holding means.

3. The apparatus as claimed in claim 2, further comprising tape splicing means for joining tape portions supported by aligned tape holding means.

4. The apparatus as claimed in claim 1, wherein said auxiliary threading means comprises movable tape engagement means for holding a foremost portion of said waste tape length and moving said foremost portion into operative engagement with a tape take-up device.

5. The apparatus as claimed in claim 1, further comprising first and second extractor elements each movably mounted so as to be movable between first, second and third positions.

6. The apparatus as claimed in claim 5, wherein said first position of said extractor elements is a rest position in which said extractor elements are positioned in an access space formed in a cassette engaged in said loading station, and wherein said second position of said extractor elements is an intermediate position wherein the tape extracted from a cassette is engaged in said loading station and is to be shifted laterally with respect to said first, second, third and fourth tape holding means.

7. The apparatus as claimed in claim 6, further comprising sensor means for detecting the presence of waste tape in a cassette engaged in said loading station.

8. The apparatus as claimed in claim 7, wherein said sensor means is capable of detecting whether waste tape is wound on one or both of the hubs of a cassette engaged in said loading station.

* * * * *